(12) United States Patent
Gampper et al.

(10) Patent No.: US 6,442,601 B1
(45) Date of Patent: Aug. 27, 2002

(54) SYSTEM, METHOD AND PROGRAM FOR MIGRATING FILES RETRIEVED FROM OVER A NETWORK TO SECONDARY STORAGE

(75) Inventors: James Michael Gampper; Tarek Makansi; Daniel Charles Wolfe, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/276,350

(22) Filed: Mar. 25, 1999

(51) Int. Cl.⁷ ............................................. G06F 15/173
(52) U.S. Cl. ........................ 709/218; 709/219; 711/161
(58) Field of Search ................................ 709/208, 217, 709/218, 219; 707/10, 204; 711/154, 161, 162

(56) References Cited

U.S. PATENT DOCUMENTS

| | | | |
|---|---|---|---|
| 5,276,867 A | 1/1994 | Kenley et al. | 707/204 |
| 5,313,631 A * | 5/1994 | Kao | 707/204 |
| 5,367,698 A | 11/1994 | Webber et al. | 709/203 |
| 5,452,447 A | 9/1995 | Nelson et al. | 707/205 |
| 5,564,037 A * | 10/1996 | Lam | 711/161 |
| 5,764,972 A * | 6/1998 | Crouse et al. | 707/1 |
| 6,026,414 A * | 2/2000 | Anglin | 707/204 |
| 6,070,228 A * | 5/2000 | Belknap et al. | 711/118 |
| 6,192,408 B1 * | 2/2001 | Vahalia et al. | 709/229 |
| 6,233,606 B1 * | 5/2001 | Dujari | 709/213 |
| 6,256,636 B1 * | 7/2001 | Choy | 707/103 |

OTHER PUBLICATIONS

W. Collins et al., "Network File Storage System", Feb. 1982, IEEE Computer Society International Conference, Spring COMPON 82, 24th , San Francisco, Digest of Papers, pp. 20–23.

K. Shaffer et al., "Predictor of Requested Imagery and Migration Engine (PRIME)", Oct. 1994., Image and Information Systems: Applications and Opportunities: Proceedings of AIPR Workshop, 23rd , Washington, pp. 88–94.

IBM Corporation, "ADSTAR Distributed Storage Manager (ADSM)—Hierarchical Storage Management (HSM) White Paper", Mar. 1996.

P. Scheuermann et al., "Case for Delay–conscious Caching of Web Documents", Computer Networks and ISDN Systems vol. 29, Issue 8–13, pp. 997–1005, Sep. 1997.

* cited by examiner

*Primary Examiner*—Dung C. Dinh
(74) *Attorney, Agent, or Firm*—David W. Victor; Konrad, Raynes, Victor & Mann

(57) ABSTRACT

Disclosed is a system, method, and program for caching files retrieved from a server over a network. A computer system receives a request from a requesting computer system for a file maintained on the server. The computer system is capable of communicating with the server via the network. The computer system retrieves the requested file from the server over the network and stores a copy of the requested file in a primary storage. The computer system further returns another copy of the requested file to the requesting computer system. The computer system determines retrieved files to migrate from the primary storage to a secondary storage and migrates the determined retrieved files from the primary storage to the secondary storage. To determine the files to migrate from primary storage to secondary storage, the computer system may determine a distribution of file requests per unit of time according to file size for files maintained in the primary storage and the secondary storage. The computer system then processes the determined distribution and a provided maximum number of file requests per unit of time to determine a minimum file size for migration. Files having a size greater than the minimum file size for migration are migrated from the primary storage device to the secondary storage device.

39 Claims, 8 Drawing Sheets

SYSTEM, METHOD AND PROGRAM FOR MIGRATING FILES RETRIEVED FROM OVER A NETWORK TO SECONDARY STORAGE

BACKGROUND OF THE INVENTION

1. Field of the Invention

The present invention relates to a method, system, and program for migrating files maintained in a proxy server primary cache storage medium to a secondary cache storage medium that provides additional storage space to improve network bandwidth conservation.

2. Description of the Related Art

A person accesses the Internet or World Wide Web using an Internet Web browser, also known as an Hyper Text Transfer Protocol (HTTP) client, that can process Web pages coded in the Hyper Text Markup Language (HTML) format. The HTTP client sends a request message to a server over the Internet which includes HTTP server software to process the request message. The request message typically includes a Universal Resource Locator (URL) which specifies the path of the requested information on the Internet and the name of the file at the specified path. The HTTP server processes the request and returns the requested file at the URL if it is available as part of a response message to the requesting HTTP client.

The popularity of the World Wide Web has led to long communication delays to retrieve information from servers connected to the World Wide Web client/server architecture. Two of the primary causes of server and Internet communication delay are bandwidth constraints of the transmission medium between computer systems and latency in server processing time of file requests. Bandwidth constraints are exasperated as network traffic increases and reduces available bandwidth resources to handle further transmissions. Current techniques for addressing communication delay include increasing the bandwidth by developing more robust transmission medium and conserving bandwidth by using proxy servers. Proxy servers cache previously requested files retrieved from over a network, such as the Internet. The proxy server conserves network bandwidth by servicing requests for network files from the cache instead of consuming bandwidth to retrieve the requested file from over the network.

A caching proxy server is a server that provides an interface between client computers and the World Wide Web. A client that accesses the World Wide Web via a proxy server requests the web page from the proxy server. The proxy server processes the request by first determining whether the requested web page is maintained in local cache. If so, the proxy server returns the requested web page from the local cache. Otherwise, the proxy server acts to retrieve the requested web page over the World Wide Web network. The request may utilize a communication protocol such as the HTTP, file transfer protocol (FTP), etc. Upon retrieving the requested web page, the proxy server stores the web page in local cache and returns the page to the requesting client. Subsequent requests for the web page may be serviced from the cache. In this way, the proxy server conserves bandwidth by returning files from cache instead of network transmission lines. Returning requested data from local cache not only conserves bandwidth, but also improves retrieval speed if the retrieval time from the cache storage medium is faster than the network transmission time.

One problem with caching proxy servers is the storage limitations of the local cache. The proxy server must continuously delete files from the local cache to make room for more recently retrieved web pages. This in turn reduces the likelihood that the proxy server can return a file from cache and conserve bandwidth resources. Thus, there is a need in the art to provide an improved system for returning requested files from a cache to improve bandwidth savings over current proxy server techniques.

SUMMARY OF THE PREFERRED EMBODIMENTS

To overcome limitations in the art described above, preferred embodiments disclose a system, method, and program for caching files retrieved from a server over a network. A computer system receives a request from a requesting computer system for a file maintained on the server. The computer system is capable of communicating with the server via the network. The computer system retrieves the requested file from the server over the network and stores a copy of the requested file in a primary storage. The computer system further returns another copy of the requested file to the requesting computer system. The computer system determines retrieved files to migrate from the primary storage to a secondary storage and migrates the determined retrieved files from the primary storage to the secondary storage.

Further embodiments provide a method, system, and program for migrating the retrieved files from the primary storage to the secondary storage. A computer determines a distribution of file requests per unit of time according to file size for files maintained in the primary storage and the secondary storage. The computer then processes the determined distribution and a provided maximum number of file requests per unit of time to determine a minimum file size for migration. Files having a size greater than the minimum file size for migration are migrated from the primary storage device to the secondary storage device.

In still further embodiments, the files are retrieved from one or more servers over a network and the file requests are for files maintained in servers that are capable of being retrieved over the network. The retrieved files are initially stored in the primary storage device and may subsequently be migrated to the secondary storage device. Greater cache space comprised of both primary and secondary storage increases the likelihood that file requests may be returned from cache and not the network, which in turn conserves network bandwidth resources by avoiding having to retrieve the file from over the network.

Still further, in preferred embodiments, the secondary storage is less expensive, and likely slower, than the primary storage. The secondary storage, thus, provides an economical solution to provide greater cache space to increase network bandwidth conservation. Cost considerations play a greater role when increasing the overall cache size to a terabyte or more of storage. A less expensive secondary storage provides additional cache space to conserve network bandwidth at a cost significantly less than providing the same overall cache space with the more expensive primary storage.

In yet further embodiments, the minimum file size for migration is set to a value, such that the aggregate estimated number of file requests per unit of time for files larger than the minimum file size for migration does not exceed a processing capacity of the secondary storage, i.e., the number of file requests per unit of time that the secondary storage can process.

Preferred embodiments select files for migration from a primary to a secondary storage device based on file size.

With preferred embodiments, files are migrated in a manner such that processing requests for the files migrated to the secondary storage will not cause retrieval from secondary storage to exceed the retrieval capacities of the secondary storage. In this way, network bandwidth is conserve because requested files may be retrieved from the secondary storage instead of retrieving such files from a server over the network.

Preferred embodiments are particularly advantageous to provide secondary storage for files retrieved from a network, such as the Internet, by a proxy server. Typically, in a proxy server system, smaller files are requested substantially more frequently than larger files. Preferred embodiments, thus, migrate the larger, less frequently requested files. This allows for substantial network bandwidth savings because the larger files which consume more of the network bandwidth may be retrieved from secondary storage instead of being retrieved from over the network. Further, by leaving room in the typically faster primary storage device or cache for the smaller files, overall response time to file requests is improved because the smaller files are requested more frequently.

Preferred embodiments further provide a dynamic method for determining the minimum file size for migration based on current file request statistics. This dynamic method insures that current file request data or an average of current and past file request data is used to select a minimum file size for migration that incorporates recent file request trends. Preferred embodiments select a minimum file size for migration such that the estimated total requests per unit of time for files larger than the minimum file size for migration is within the processing capacity of the secondary storage device. If too many files are migrated, then the number of file requests directed to the secondary storage per unit of time may exceed the file request processing capacity of the secondary storage and cause requests to accumulate in a lengthy queue. Substantial delays may occur in processing such lengthy queues of file requests against the secondary storage. Such delays obviate the benefit of secondary storage because at some point it will become more efficient to retrieve the file from over the network instead of waiting in the queue to access secondary storage. Thus, preferred embodiments provide a method for determining the minimum file size for migration to limit the number of files migrated in order to avoid a situation where file requests toward secondary storage exceed the secondary storage processing capacity.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
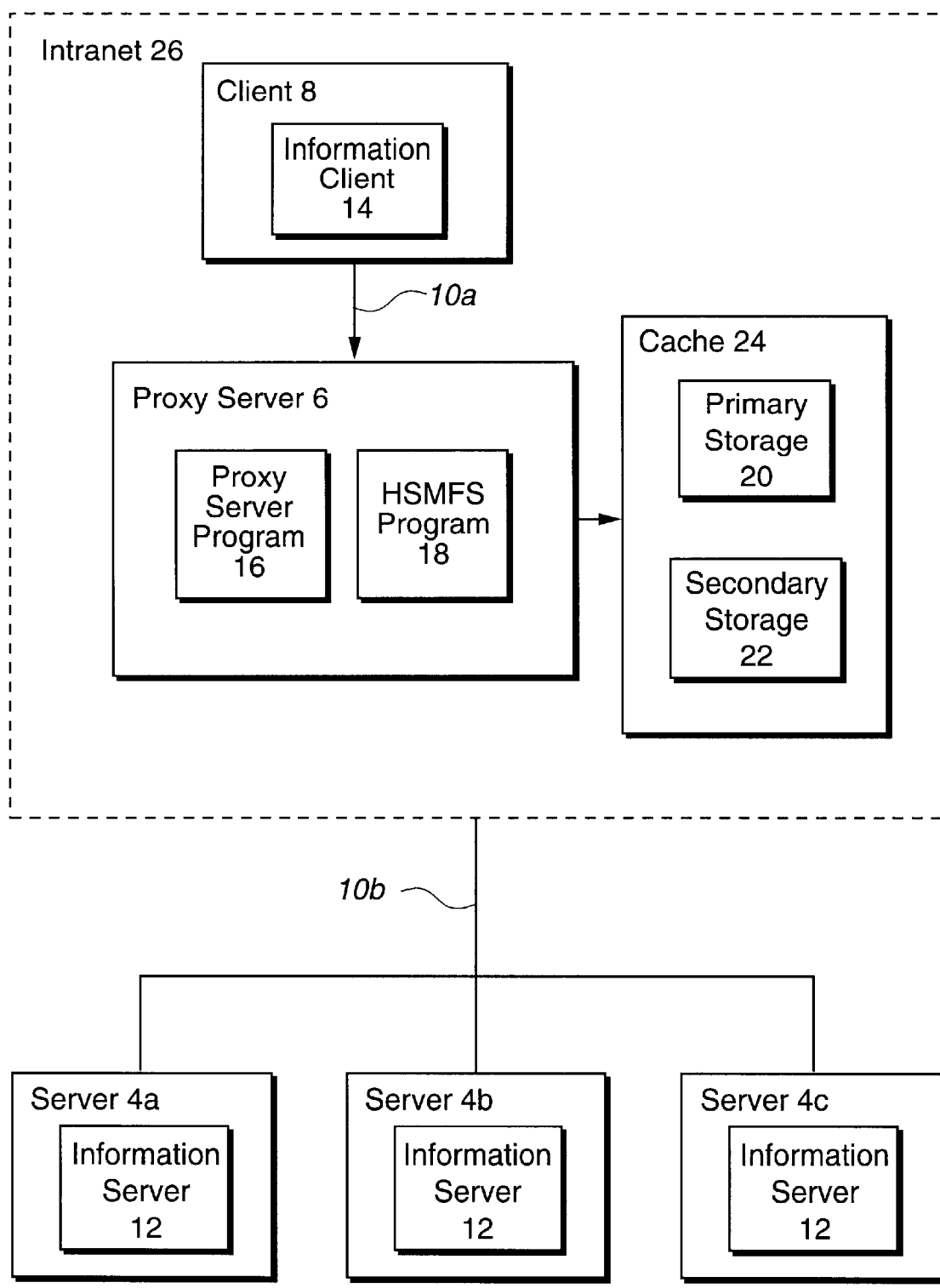
FIG. 1 is a block diagram illustrating a software and hardware environment in which preferred embodiments of the present invention are implemented.

FIG. 1 illustrates a hardware and software environment in which preferred embodiments of the present invention are implemented. A network 2 consists of servers 4a, b, c, a proxy server 6, and a client 8 that communicate over networks 10a, b. The servers 4a, b, c include an information server 12 program, such as the HTTP server protocol software. The client 8 includes an information client 14, such as a web browser which includes HTTP client software for communicating with the information server 12 program. The client 8 communicates with the proxy server 6 via network 10a, and the proxy server 6 communicates with servers 4a, b, c via network 10b. The networks 10a, b may be a TCP/IP network, such as the Internet and World Wide Web, or any other network system known in the art. The proxy server 6 includes a proxy server program 16. The proxy server program 16 is capable of functioning as both an information server 12 and client 14, and capable of implementing both the client and server functions for web protocols such as HTTP, FTP, Gopher, WAIS, NNTP, etc. The proxy server program 16 may include features of proxy programs known in the art, such as the MICROSOFT® Proxy Server software, Squid, etc., and additional programming elements to implement the preferred embodiments of the present invention. Squid is a proxy server program copyrighted by the University of California San Diego and Duane Wessels; MICROSOFT is a registered trademark of the Microsoft Corporation.

In preferred embodiments, the servers 4a, b, c, proxy server 6, and client 8 may be any computer system or processing device known in the art, such as a personal computer, workstation, mainframe, portable computer, personal digital assistant, etc. In preferred embodiments, the information client 14 generates a user interface that allows the user to use the client 8 computer to access the other systems 6, 4a, b, c, over the networks 10a, b. The information client 14 may be an Internet browser program capable of interpreting, requesting, and displaying files in the HTML format, e.g., NETSCAPE® Communicator, the MICROSOFT® Internet Explorer, Spry Mosaic, NCSA Mosaic, Lynx, Opera, GNUscape Navigator et. NETSCAPE is a registered trademark of the Netscape Communications Corporation. The information server 12 included in the servers 4a, b, c may be the HTTP server protocol or any other file retrieval software known in the art. The HTTP server protocol is described in "Hypertext Transfer Protocol—HTTP/1.1," Network Working Group, Request for Comments No. 2068 (January, 1997), which publication is incorporated herein by reference in its entirety.

The proxy server 6 further includes a cache 24 including a primary storage 20 and secondary storage 22. In preferred embodiments, the primary storage 20 is implemented in hard disk drives (HDDs). The secondary storage 22 is preferably implemented in a storage medium that is less expensive per unit of storage than the primary storage 20, such as a tape or optical library. In this way, the secondary storage 22 substantially increases the storage capacity of the cache 24 in a cost effective manner. When implemented as a tape library, the secondary storage 22 would including tape cartridges, one or more tape drives, and an autochanger. The autochanger includes cartridge grippers and is capable of selecting cartridges from a library of tape cartridges and mechanically removing and inserting selected tape cartridges in one or more tape drives. Examples of tape libraries which may be used for the secondary storage 22 include the International Business Machines ("IBM") Magstar 3575 Tape Library, which may provide up to several terabytes of storage space. The Magstar 3575 is described in IBM publication "Magstar MP 355 Tape Library Dataserver: Multiplatform Implementation," IBM document no. SG24-4983-00 (Copyright IBM Corp. 1998), which publication is incorporated herein by reference in its entirety. However, other storage devices and combinations of storage devices known in the art may be used for the primary 20 and secondary 22 storage, including volatile memory devices and non-volatile memory, such as hard disk drives, tape library, optical disk library, holographic units, etc. In alternative embodiments, the primary 20 and secondary 22 storage may be comprised of similar storage medium or different medium combinations from those described above.

When the information client 14 transmits a request for a file at a URL address at one of the servers 4a, b, c, the request is transferred via the network 10a to the proxy server 6. The proxy server program 16 is capable of returning the requested file from the primary storage 20 and secondary storage 22, or retrieving the requested file from a server 4a, b, c over the network 10b. Preferred embodiments, thus, substantially increase cache 24 storage space through the use of a secondary storage 22 device which provides more storage space per unit of cost than the primary storage 20.

The proxy server 6 further includes a hierarchical storage management file system (HSMFS) program 18 that controls the movement of files between the primary storage 20 and the secondary storage 22. The HFSMS program 18 may include features found in hierarchical storage management programs known in the art, such as the IBM ADSTAR Distributed Storage Management (ADSM) product, that provide backup/archive support and migrate less frequently used files to the secondary storage 22 from the cache 20. The IBM ADSM product is described in "ADSM Version 2 Presentation Guide," (IBM Document SG24-4532-00, International Business Machines, copyright 1995), which publication is incorporated herein by reference in its entirety.

In certain embodiments, the proxy server 6, client 8, and cache 24 may all be located within an Intranet 24. In such case, the proxy server 6 provides a gateway through which the client 8 must pass to access the World Wide Web or other external sites, e.g., servers 4a, b, c. In these embodiments, the proxy server program 16 may include a firewall and filtering functions to provide security and control access to prohibited external Internet sites. Alternatively, the network 10a may be a dedicated connection operated by an Internet Service Provider (ISP), such as a cable or other high speed connection. In such case, the proxy server 6 provides clients 8 access to the network 10b, which may be the Internet. Still further, the client 8 may communicate with the proxy server 6 via a phone or modem connection through the Internet. In such case, the client 8 would access the World Wide Web through the proxy server 6. The proxy server program 16 may further include caching algorithms to store in cache 24 files retrieved from the servers 4a, b, c. In this way, the proxy server 6 can respond to a request from the client 8 from cache 24 if the requested document was previously retrieved from the servers 4a, b, c and stored in cache 24.

By substantially increasing the cache 24 size through the use of secondary storage 22, preferred embodiments increase the likelihood that a file request can be serviced from cache 24, thereby avoiding the need to retrieve the file from over the network 10b. This in turn conserves network bandwidth because the proxy server 6 is servicing more file requests from cache 24 instead of the network 10b.

Migration of Data from The Proxy Server Cache to Secondary Storage

The HSMFS program 18 includes program logic to determine which files to migrate from the primary storage 20 to secondary storage 22. In preferred embodiments, the program logic selects files having a minimum file size for migration. Thus, preferred embodiments favor migrating the larger files from primary storage 20 cache 20 to secondary storage 22. This allows the proxy server program 16 to return a requested file from the cache 20 or secondary storage 22 in lieu of retrieving the requested file from over the network 10b.

Figure 2:
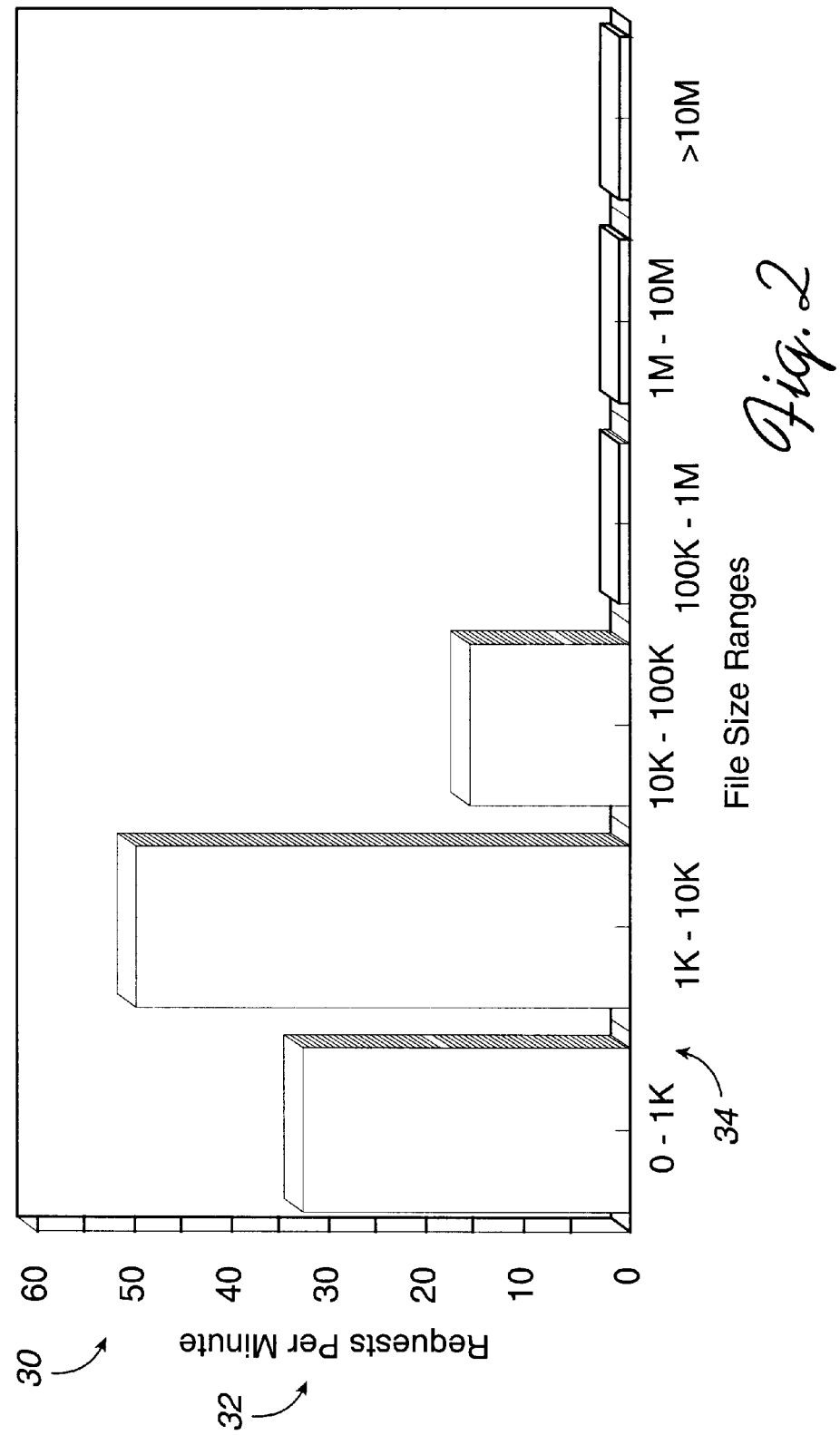
FIG. 2 is a graph illustrating the requests per minute for groups of file range sizes in a proxy server.

FIG. 2 shows a graph 30 illustrating the requests per minute for ranges of file sizes 34 file sizes, e.g., 0–1K, 1–10K, 10K–100K, 100K–1M, etc. As shown in the graph, smaller files are requested more frequently than larger files. This graph 30 illustrates a likely distribution for file requests in a network where there are generally substantially more requests for smaller files over larger files. Preferred embodiments seek to select an optimal file size of files to migrate to enhance system performance characteristics. If too many files are migrated, then the queue of requests toward the secondary storage 22 will increase as more potential requested files are maintained in secondary storage 22. If the secondary storage 22 is comprised of a tape library that can only service 5 or 6 requests per minute, then a lengthy queue of requests toward the secondary storage could produce significant delays in returning requested files from the secondary storage 22 component of cache 24. Although retrieving files from the secondary storage 22 may take longer than retrieving the file from over the network 10b, the secondary storage 22 may still be preferred for the purpose of conserving network bandwidth. However, in certain circumstances, retrieving files from secondary storage 22 may be faster than from over the network 10b, especially for larger files that take longer to retrieve from the network 10b.

To avoid the problem of migrating too many files, preferred embodiments take advantage of the likely distribution of requests by file size, as shown in FIG. 2, to store the larger files on secondary storage 22. Because larger files generally receive significantly fewer requests than smaller files, preferred embodiments limit the number of queued requests toward the secondary storage 22 by caching the relatively larger files in secondary storage 22. Further, it is preferable to store the relatively larger files on the secondary storage 22, such as tape drives, because larger files are stored more efficiently on tape storage than smaller files.

Figure 3:
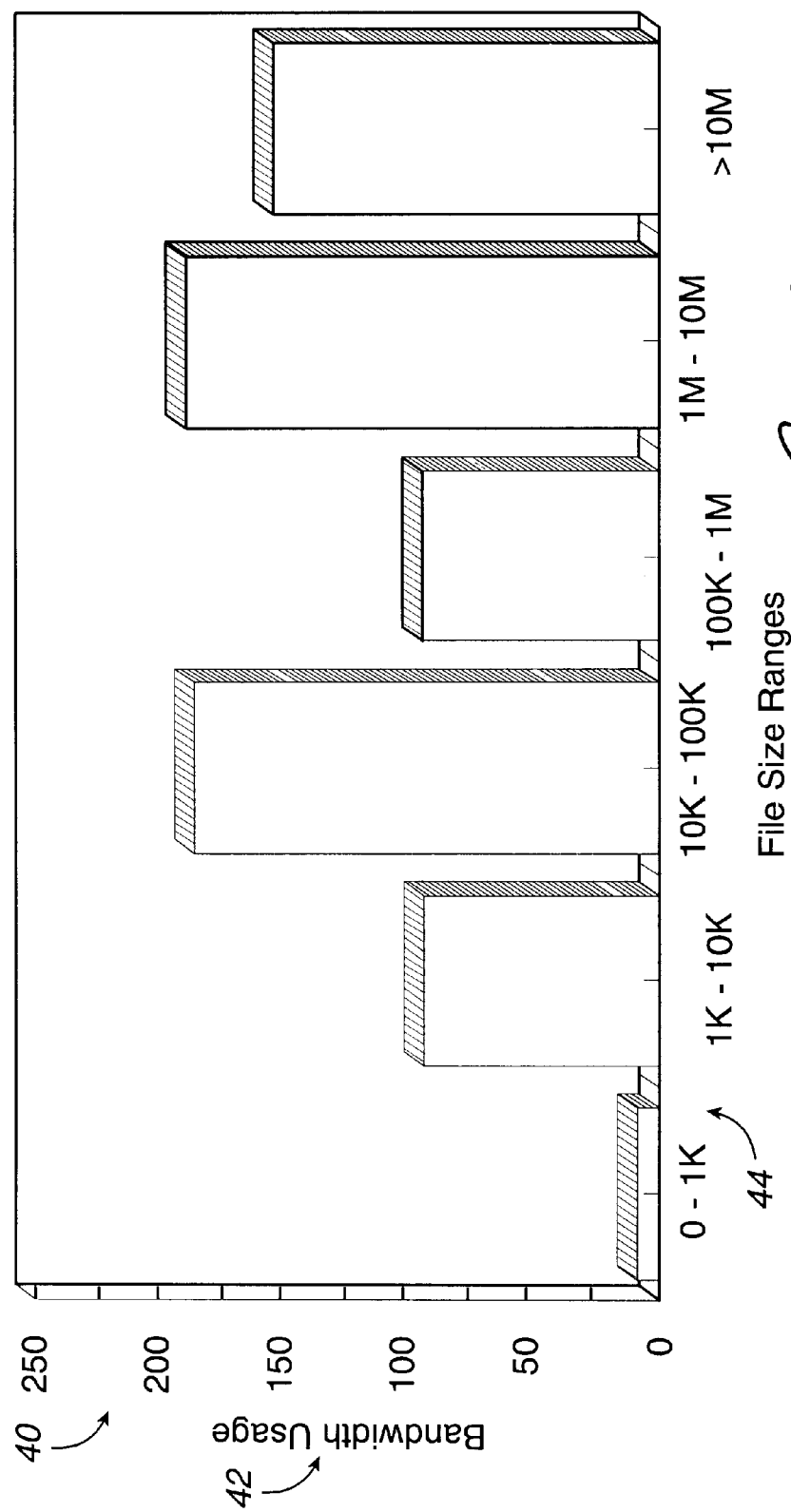
FIG. 3 is a graph illustrating the bandwidth usage for groups of file range sizes in a proxy server.

Still further, storing the larger files in secondary storage 22 produces more bandwidth savings because retrieving a larger file from over the network 10b, e.g., Internet, would consume more bandwidth than retrieving a smaller file. FIG. 3 illustrates the distribution 40 of bandwidth usage 42 for each file size range 44. This distribution of network bandwidth usage represents a typical trend in network systems, based upon a distribution of greater requests directed toward the smaller files, as shown in FIG. 2. As shown in FIG. 3, retrieving the larger sized files from the network 10b consume significantly more network bandwidth than the smaller files. The amount of bandwidth usage 42 is determined by the file size and number of requests for the file. Thus, another benefit of storing larger files in secondary storage 22 is the bandwidth savings of not having to retrieve the larger files from over the network 10b.

If larger files are migrated to secondary storage 22, then there is more room in cache 24 and the preferably faster primary storage 20 to maintain the more frequently requested smaller files. Thus, the preferred embodiments, return the more frequently requested smaller files from a faster medium to improve overall system performance. For these additional reasons, it is advantageous to maintain the larger files in the secondary storage 22 and the smaller files in the primary storage 20.

Figure 4:
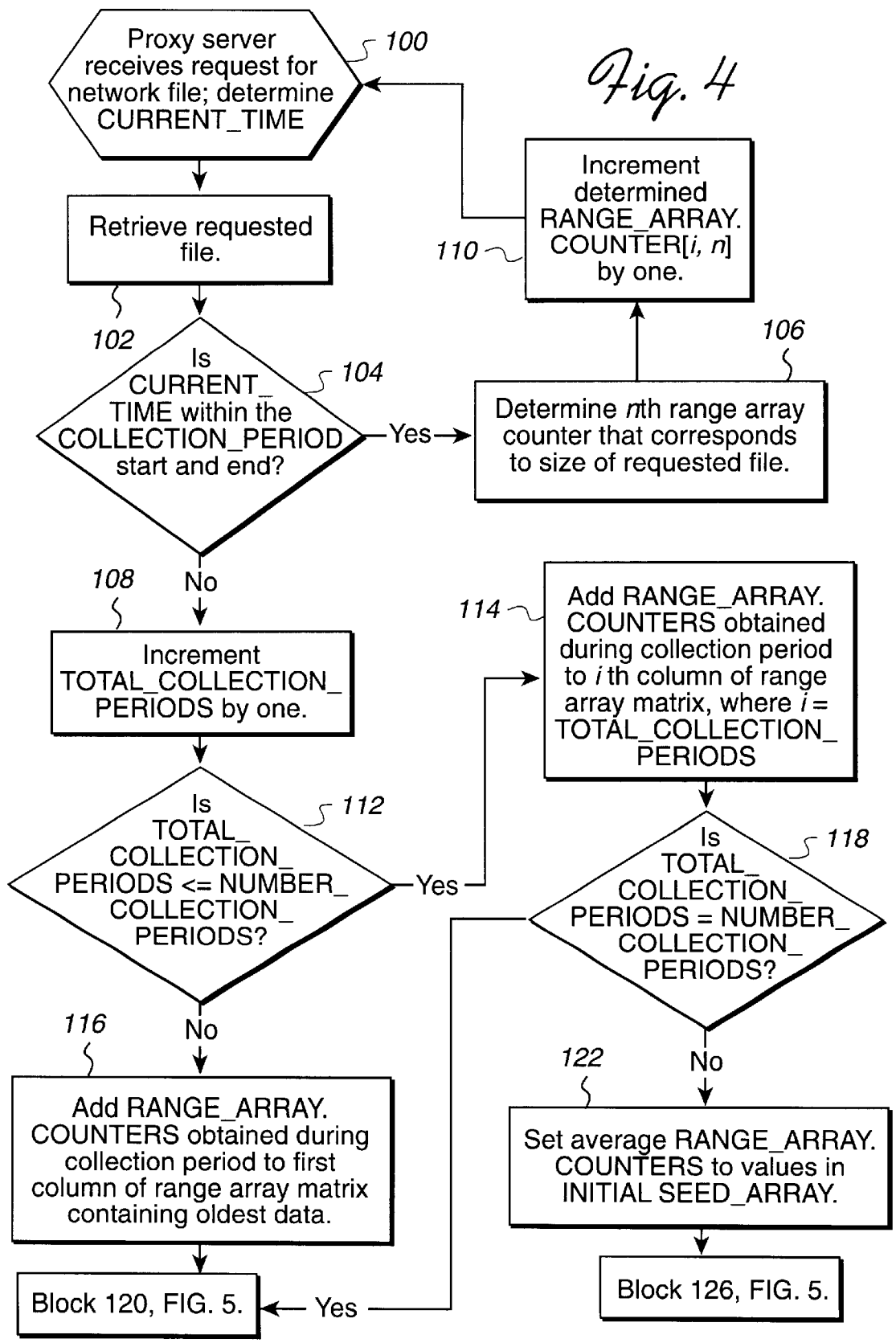
FIGS. 4 and 5 illustrate logic to migrate files from a primary storage to secondary storage in accordance with preferred embodiments of the present invention.

FIG. 4 illustrates logic, which in preferred embodiments is implemented as software code within the HSMFS program 18, to select an optimal minimum file size for migration. All files of size greater or equal to such minimum file size are migrated from the primary storage 20 to secondary storage 22. Preferred embodiments determine the file request rate for different file size ranges and, based on this data, dynamically select a minimum file size for migration. The logic of FIG. 4 utilizes the following variables and data structures described below to calculate the minimum file size for migration:

CURRENT_TIME: The current time, usually obtained from a system clock or from some other time keeping mechanism known in the art.

COLLECTION_PERIOD.START: time at which the daily data collection period begins, e.g., 8:00 AM.

COLLECTION_PERIOD.END: time at which the daily data collection period ends, e.g., 5:00 PM. The start and end of the collection period may define any segment of time during the day. In this way, data may be collected during peak usage times only. The data collected during the collection period is used to determine the minimum file size for migration.

NUMBER_COLLECTION_PERIODS: The number of collection periods for which data is collected and the minimum file size for migration is calculated, e.g., two. The data collected over multiple collection periods is averaged by this value. This value is typically set by the system administrator.

TOTAL_COLLECTION_PERIODS: Actual number of collection periods for which data has been accumulated since system initialization.

RANGE_ARRAY[n]: A file size range group, defined by a LOW and HIGH value, for which data is collected. Preferred embodiments determine the number of requests for files in each file range size n. For instance, request data may be collected for the following seven file size ranges:

| | |
|---|---|
| RANGE_ARRAY.LOW[0] = 0 | RANGE_ARRAY.HIGH[0] = 10KB |
| RANGE_ARRAY.LOW[1] = 10KB | RANGE_ARRAY.HIGH[1] = 100KB |
| RANGE_ARRAY.LOW[2] = 100KB | RANGE_ARRAY.HIGH[2] = 1MB |
| RANGE_ARRAY.LOW[3] = 1MR | RANGE_ARRAY.HIGH[3] = 10MB |

-continued

| | |
|---|---|
| RANGE_ARRAY.LOW[4] = 10MB | RANGE_ARRAY.HIGH[4] = 50MB |
| RANGE_ARRAY.LOW[5] = 50MB | RANGE_ARRAY.HIGH[5] = 100MB |
| RANGE_ARRAY.LOW[6] = 100MB | RANGE_ARRAY.HIGH[6] = 10GB |

RANGE_ARRAY[i, n].COUNTER: A matrix data structure that contains i columns of counters for a given collection period i and n rows of RANGE_ARRAY[i, n].COUNTERs. Each of the i columns accumulate, for a given collection period, the number of requests for files for each n range array groups, e.g., n=0–6, between RANGE_ARRAY.LOW[n] and RANGE_ARRAY.HIGH[n]. In preferred embodiments, the number of i columns is equal to the NUMBER_COLLECTION_PERIODS+1, such that counters are maintained for each collection period used in determining the average number of requests per minute for each array group. The final column, i.e., the (NUMBER_COLLECTION_PERIODS+1)th column, is a total column that maintains, for each range array group n, the aggregate of the RANGE_ARRAY[n].COUNTERs across all the collection periods, i.e., columns, for each given n.

INITIAL_SEED_ARRAY. Column of default values of RANGE_ARRAY[n].COUNTERs, which may be set by a systems administrator, that are used before a full matrix of data is collected. Thus, before data is collected for the NUMBER_COLLECTION_PERIODS, those columns of the RANGE_ARRAY matrix that do not include collected data are filled with the values in the seed array.

MAX_LIBRARY_REQUESTS_PER_HOUR: A configurable value specifying the maximum number of requests per hour that the secondary storage 22 can process. If the secondary storage 22 is a tape cartridge library, then the requests per hour may be in the order of 30 requests per hour, or 5 requests per minute. This value may be set by the system administrator or dynamically calculated during system operation. Further, the maximum requests may be provided for time periods other than a minute, such as any fraction or multiple of a minute.

MIN_MIGRATE_FILE_SIZE: The value to calculate, which is the minimum file size for migration, such that all files having a file size greater or equal to the minimum file size are eligible for migration.

Figure 5:
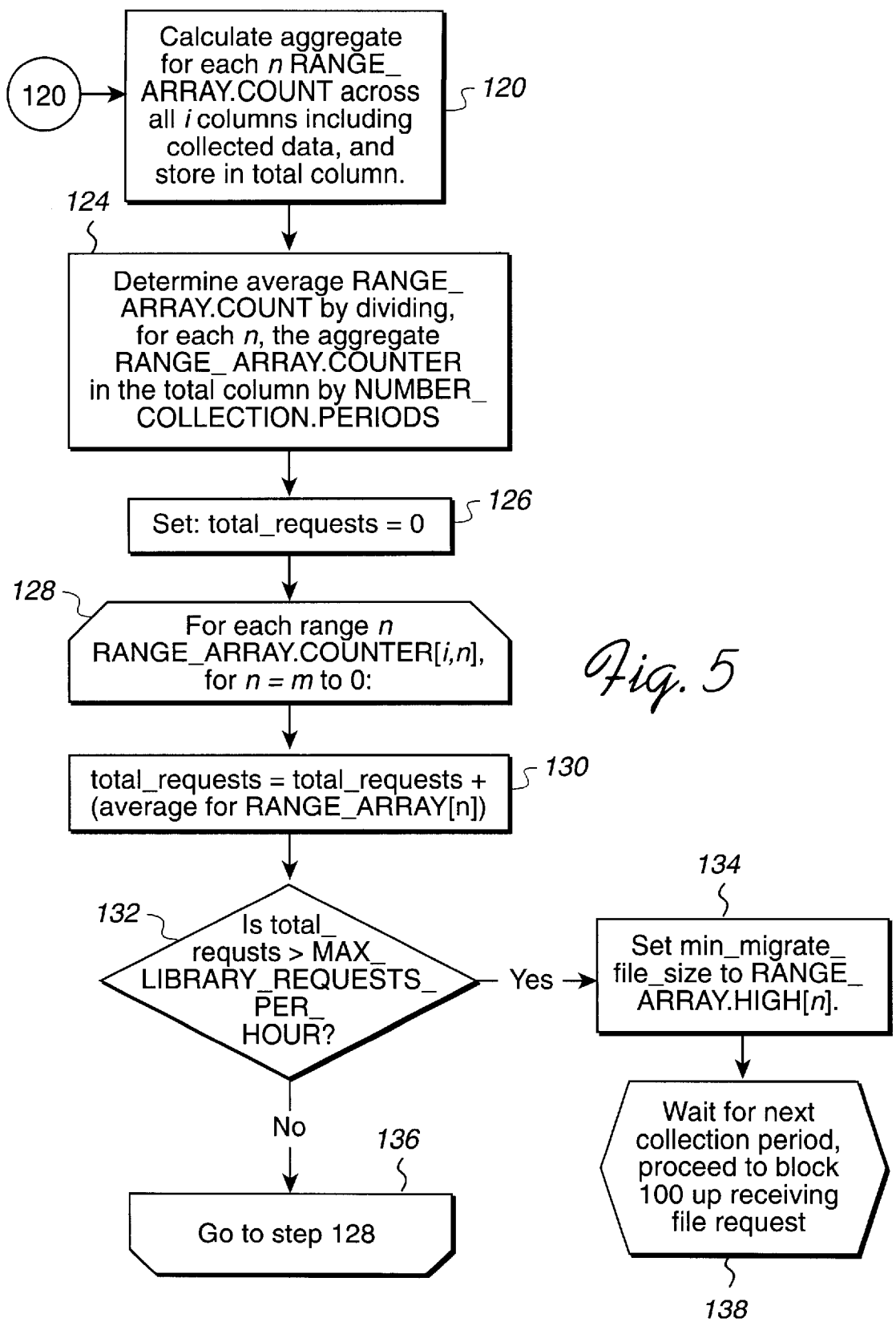

FIGS. 4 and 5 illustrate logic implemented in the HSMFS program 18 to determine the MIN_MIGRATE_FILE_SIZE from the data collected in the RANGE_ARRAY.COUNTER [i, n] matrix. Control begins at block 100 where the proxy server 16 receives a request for a file maintained in a server 4a, b, c in the network 10b when the previously received request was received during a collection period. At block 100, the HSMFS program 18 also determines the CURRENT_TIME. Control transfers to block 102 where the proxy server program 16 retrieves the requested file from cache 24 or from a server 4a, b, c over the network 10b. The proxy server program 16 may use the algorithm described with respect to FIGS. 7 and 8 to determine whether to retrieve the requested file from primary storage 20, secondary storage 22 or bypass cache 24 and retrieve the requested file from over the network 10b.

Control then transfers to block 104 where the HSMFS program 18 determines whether the CURRENT_TIME is within the COLLECTION_PERIOD.

If so, control transfers to block 106; otherwise control transfers to block 108 to increment the TOTAL_COLLECTION_PERIODS by one. At block 106, the HSMFS program 18 determines the RANGE_ARRAY_COUNTER[n] that maintains the number of requests for the file size range including the file retrieved at block 102. Control then transfers to block 110 where the HSMFS program 18 increments the determined RANGE_ARRAY_COUNTER[n] by one. From block 110, control transfers back to block 100 to await further file requests.

From block 108, control transfers to block 112, where the HSMFS program 18 determines whether TOTAL_COLECTION PERIODS≦NUMBER_COLLECTION PERIODS, i.e., whether enough collection periods have occurred in order to use the collected data over the default data maintained in the INITIAL_SEED_ARRAY. If so, control transfers to block 114 where the HSMFS program 18 adds the values in the n range array counters to a column in the RANGE_ARRAY_COUNTER[i, n] matrix that does not include previously collected data. This column may be the column i, where i=TOTAL_COLLECTION_PERIODS, i.e., the last column for which collected data is maintained. Control then transfers to block 118 where the HSMFS program 18 determines whether the TOTAL_COLLECTION_PERIODS equals the NUMBER_COLLECTION PERIODS. If so, then control transfers to block 120 in FIG. 5 where the minimum file size for migration may be determined from collected data. Otherwise, control transfers to block 122 to use the default values in the INITIAL_SEED_ARRAY as the average values for the RANGE_ARRAY_COUNTERs. In alternative embodiments, a mixture of default data and collected data may be used to determine the average number of file requests toward each file range, i.e., the average of the RANGE_ARRAY_COUNTERs. From block 122, control transfers to block 126 in FIG. 5 to determine the minimum file size for migration from the default values.

If data has been collected for more than the number of collection periods, i.e., TOTAL_COLLECTION_PERIODS greater than the NUMBER_COLLECTION PERIODS, then control transfers to block 116 where the HSMFS program 18 adds the values in the n range array counters to the column in the RANGE_ARRAY_COUNTER[i, n] matrix maintaining collected data for the oldest collection period. For instance, the newly collected data may be stored in column 0. In this way, after data has been collected for the minimum number of collection periods, the data for the oldest collection period is replaced with the data for the recently completed collection period. The data in the RANGE_ARRAY_COUNTER matrix is used to calculate a running average of file requests for each n file size range.

From blocks 116 or 118, when data is collected for at least the NUMBER_COLLECTION_PERIODS, control transfers to block 120 in FIG. 5 where the HSMFS program 18 calculates the total for each n RANGE_ARRAY_COUNTER[i, n] across all i columns that include collected data. This total across all n counters is stored in the total column of the range array matrix. Control then transfers to block 124 where the HSMFS program 18 calculates the average RANGE_ARRAY_COUNTER[i, n] for each n across all columns or collection periods, by dividing the determined total RANGE_ARRAY_COUNTER[i, n] by the NUMBER_COLLECTION_PERIODS. These calculated average range counter values are then placed in the last column of the RANGE_ARRAY_COUNTER[i, n] matrix, or the (NUMBER_COLLECTION_PERIODS+1)th column, which now becomes the "average column." The calculated averages thus represent the average requests per file size range over multiple collection periods. As mentioned, at the end of each collection period, this average number would be recalculated thereby maintaining a running average used to dynamically adjust the minimum file size for migration to accommodate any recent file request trends. Control then transfers to blocks 126 et seq. to use the calculated average RANGE_ARRAY_COUNTERs in the average column to determine the minimum file size for migration, i.e., MIN_MIGRATE_FILE SIZE.

At block 126, the HSMFS program 18 sets total_requests to zero. This is a local variable used in determining the minimum file size for migration. Control transfers to block 128 where the HSMFS program 18 begins a loop that is capable of performing iterations for each n file size group from m to 0, where m is the group size for the largest file size range. The loop may be exited prematurely at block 134 before n=0 is considered. For instance, in the example above of the RANGE_ARRAY, m=6 as there are 0–6 file size range groups. At block 130, the HSMFS program 18 sets the total_requests to the current value of total_requests plus the average range array value for the nth range array, as maintained in the average column of the range array matrix. Thus, total_requests maintains a running total of all requests made, across all file size ranges previously added to total_requests. Control transfers to block 132 where the HSMFS program 18 determines whether the total_requests is greater than the number of requests the secondary storage 22 can handle per hour, i.e., MAX_LIBRARY_REQUESTS_PER_HOUR. If so, then control transfers to block 134 where the MIN_MIGRATE_FILE_SIZE is set to RANGE_ARRAY.HIGH[n]. In this way, a determination is made as to whether migrating files in the next smallest file size range (the nth size group) in addition to the files in the larger file size ranges previously accumulated is greater than the number of retrieval requests that can be processed against the secondary storage 22 in an hour. If so, then the system will not migrate files from this nth size group,. Instead, the only files migrated are those having a size greater than or equal to the size of files maintained in the (n+1)th group, i.e., files greater than or equal to the RANGE_ARRAY.HIGH[n], which is the upper boundary of the nth group and lower boundary of the (n+1)th group. Thus, all files having a size greater than the RANGE_ARRAY.HIGH[n] are migrated.

From block 134 control transfers to block 138 to proceed to the next collection group. At this point, the HSMFS program 18, upon receiving the next file request, may determine whether the current time is within a next collection period. If so, control would transfer back to block 100 to process the file request and collect data. If not, then the proxy server program 16 would process the request and not collect data until the next collection period begins. If, at block 132, the total requests are not greater than the processing capacity of the secondary storage 22, then control transfers to block 136 to perform another iteration of the loop at block 128 for the next (n−1)th range array file size range to determine whether adding files in the next smallest file size range to the queue would cause the total_requests to exceed the secondary storage 22 hourly processing capacity.

In this way, the logic insures that, based on statistical data gathered for file requests directed toward different file group ranges, files below a certain size will not be migrated if migrating those files to the secondary storage 22 would cause the request rate toward the secondary storage 22 to exceed the per hour rate at which the secondary storage 22 processes queued requests. If the estimated file request rate for the migrated files is less than or equal to the rate of the secondary storage 22, then on average no requests will be queued. However, even if the determined minimum file size for migration is used, in operation, requests may be queued if a burst of file requests is received.

Files in the primary storage 20 having a size greater than or equal to the minimum file size for migration may be migrated in manners known in the art. The files eligible for migration may be migrated at predetermined intervals, whenever the available space in cache 20 reaches a predetermined threshold, etc.

Figure 6:
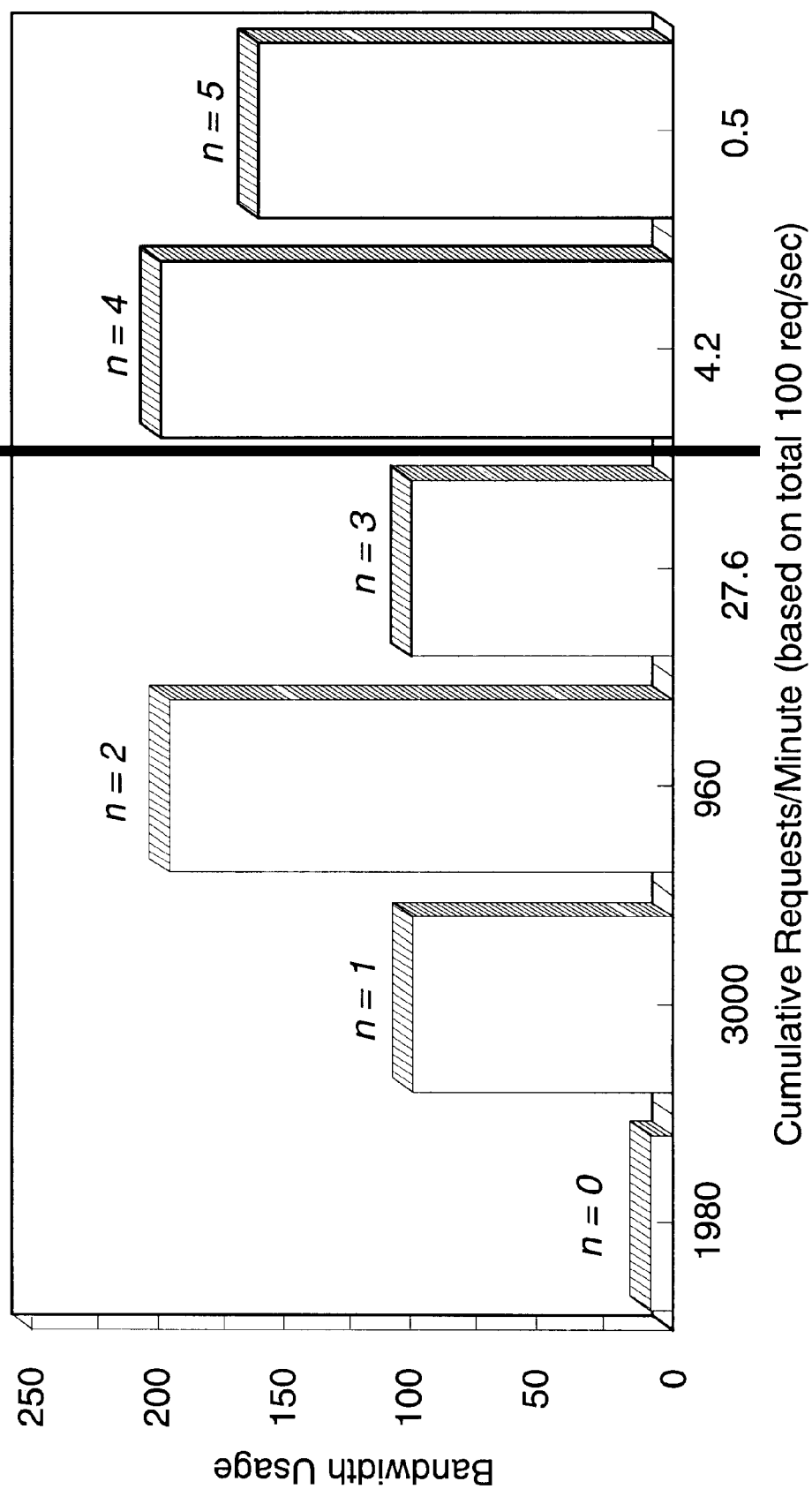
FIG. 6 is a graph illustrating how a minimum file size for migration is determined in accordance with preferred embodiments of the present invention.

FIG. 6 illustrates an example of how the logic of FIGS. 4 and 5 determines the minimum file size for migration. FIG. 6 shows the requests per minute that the cache 24 is receiving for files in file size ranges n 0 to 5, based on the assumption that the cache 24 is receiving a total of 100 requests per second. This number is based on the distribution from FIG. 2. For instance, the cache 24 receives 0.5 requests per minute for files in the n=6 range of 100 MB to 10 GB; 4.2 requests per minute for files in the n=5 range of 50 MB to 100 MB, etc. As discussed above, the cache 24 receives far more requests per minute for files in the smaller file size ranges. FIG. 6 further illustrates the bandwidth used, i.e., bandwidth usage, to retrieve files from over a network 10b, such as the Internet. FIG. 6 shows bandwidth for each file size range n. Thus, although far more requests are received for the smaller files, the greater requests for the smaller sized files consume significantly less bandwidth than the fewer requests for the larger sized files.

With respect to FIG. 6, the algorithm of FIGS. 4 and 5 would first look at the requests per minute of the largest sized file group, or n=5. The file requests per minute is 0.5 for the largest file size range. This request rate is added to the initial total_requests value of zero. Assuming the secondary storage 22 is a tape library that can process five requests per minute, at this point, the total_requests per minute of 0.5 is less than the secondary storage 22 capacity. The algorithm would then consider the next file size range of n=4. There are approximately 4.2 requests per minute for files in this range group. Adding this 4.2 value to the current total_requests increases the total_requests to 4.7. At this point, the total_requests is still less than the secondary storage 22 capacity of 5 requests per minute. However, proceeding to the next file size range of n=3 would cause the total_requests value to exceed the processing capacity of secondary storage 22. The minimum file size for migration, shown in FIG. 6 at 154, is at the boundary between the $3^{rd}$ and $4^{th}$ file size ranges. Only files having a size greater than 10 MB would be migrated, i.e., RANGE_ARRAY. HIGH[3]. Thus, assuming requests are evenly distributed, no request would be queued.

In the example of FIG. 6, migrating files to secondary storage 22 larger than the minimum file size for migration would result in bandwidth savings of 47%. Thus, substantial bandwidth resources are conserved by migrating the larger files to secondary storage 22 and returning requested files from the secondary storage 22 instead of the network 10b. Without the secondary storage 22, retrieved files would have to be discarded from the primary storage 20 leaving fewer files available for return from cache 24. This in turn would require the network 10b to be accessed to retrieve more files, thus increasing network traffic.

Retrieving Files from Secondary Storage

Preferred embodiments provide a mechanism to determine the latency in retrieving a file from the secondary storage 22. If the secondary storage 22 latency exceeds the CONFIGURED_MAX_DELAY_TIME, then the proxy server 16 will forego retrieving the requested file from the secondary storage 22 and instead retrieve the file from over the network 10b. This maximum delay time may be set by a system administrator as a preferred threshold or maximum delay the system will endure to conserve bandwidth by retrieving the file from secondary storage 22. This use of the maximum delay time provides a stop-gap method to prevent undue queue delays in the event that an unexpected number of requests are queued against the secondary storage 22. If the queue delay or latency exceeds this maximum delay time, then the requested file will be retrieved from over the network 10b.

In further embodiments, the proxy server 16 may determine the network response time to retrieve the requested file from the server 4a, b, c over the network 10b in a manner known in the art, such as through querying or "pinging" the server 4a, b, c over the network 10b. If the estimated latency to retrieve the file from secondary storage 22 is greater than the maximum delay time, but still less than the determined network response time, then the request will be queued against the secondary storage 22. In this case, secondary storage 22 is still faster than the network 10b even though the secondary storage 22 processing time exceeds the maximum delay time. A "ping" is an Internet Control Message Protocol (ICMP) request, which requests a response from the server being pinged. Details of "pinging" and ICMP are described in the published Request For Comments (RFC) no. 792, entitled "Internet Control Message Protocol" (September, 1981), by J. Postel, which document is incorporated herein by reference in its entirety. Methods known in the art other than pinging may be used to determine the network response time.

Figure 7:
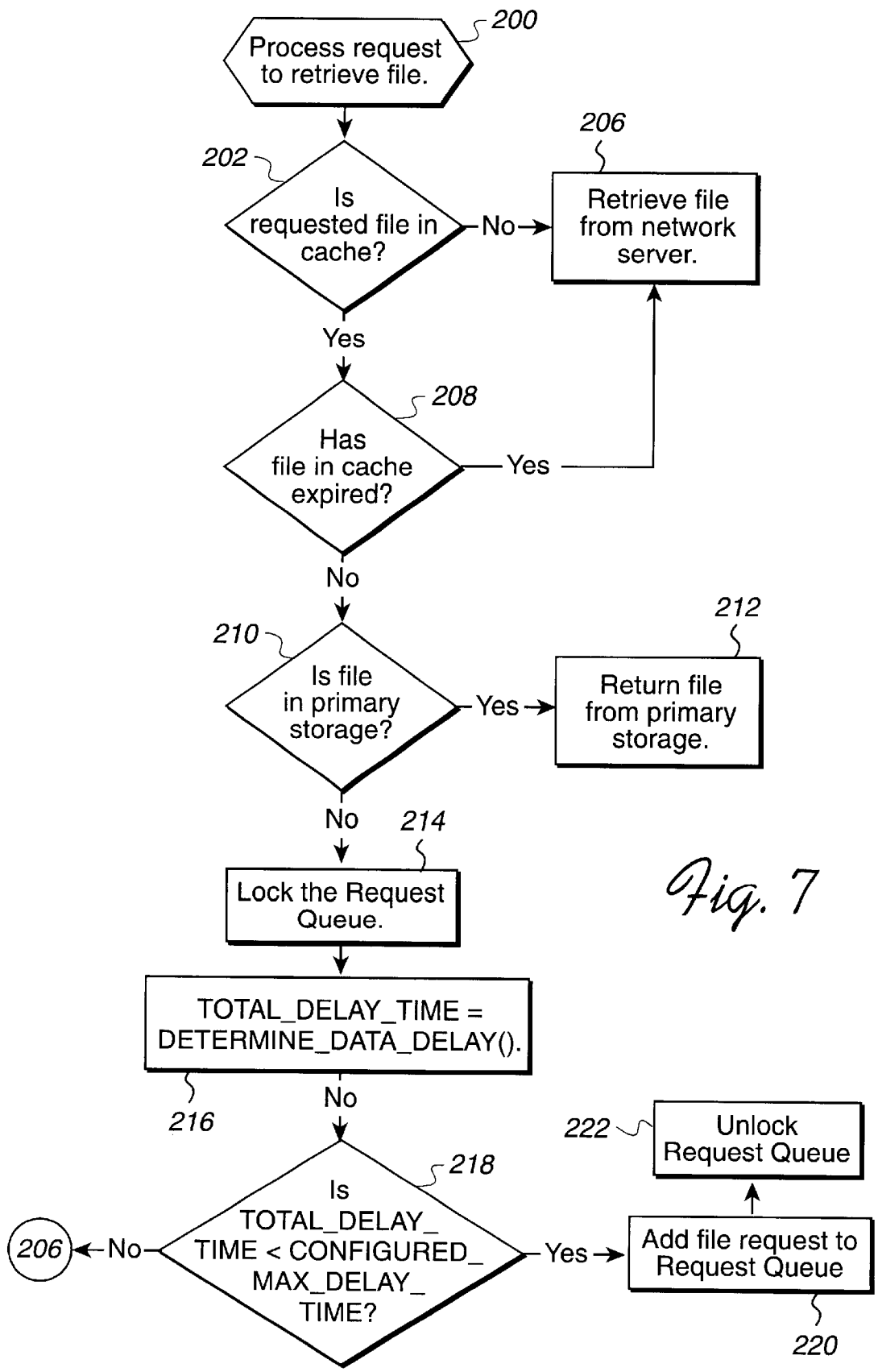
FIGS. 7 and 8 illustrate logic to determine whether to retrieve a file from the secondary storage or a server over a network in accordance with preferred embodiments of the present invention.
Figure 8:
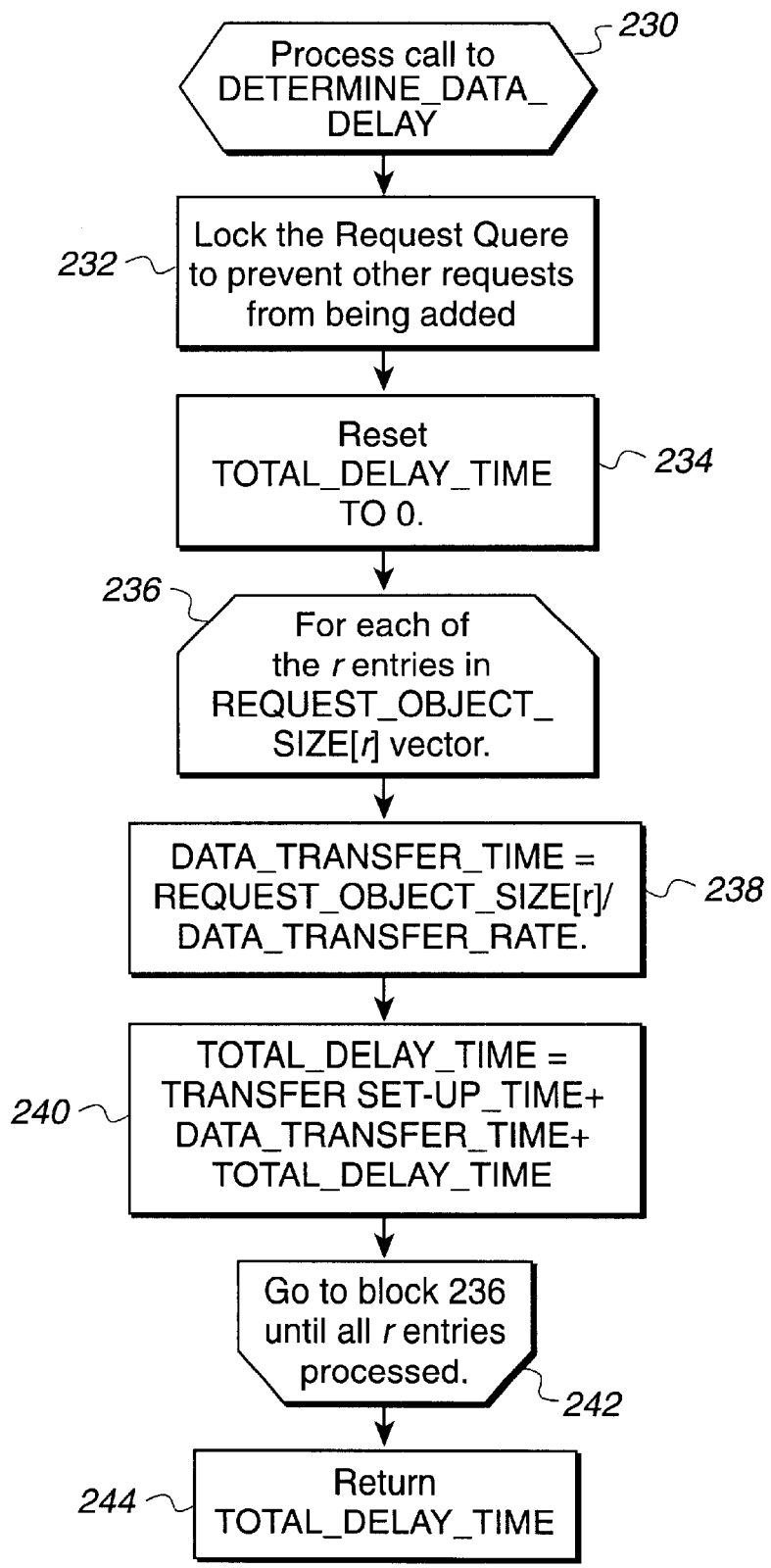

FIGS. 7 and 8 illustrate logic implemented in the proxy server program 16 to retrieve a requested file and determine whether to queue the file request against the secondary storage 22 or retrieve the file from over the network 10b. The logic of FIGS. 7 and 8 may be executed at block 102 in FIG. 4 to perform the file retrieving operation. The following variables and data structures are used with the logic of FIGS. 7 and 8:

Request Queue: Ordered list of file requests queued against the secondary storage 22.

CONFIGURED_MAX_DELAY_TIME: a preset value, that may be configurable by the systems administrator, which represents the longest acceptable delay to obtain data from the secondary storage 22.

REQUEST_OBJECT_SIZE[r]: a vector of values indicating the size of each of the r file requests queued against the secondary storage 22. This information may be maintained in a log or directory of the proxy server 6 indicating the size of each file stored in the secondary storage 22.

DATA_TRANSFER_RATE: An average expected data transfer rate for the secondary storage 22 based on the configuration and capabilities of the secondary storage 22. This value may be set by a systems administrator.

DATA_TRANSFER_TIME: A calculated value indicating the time to transfer data for a queued request from the secondary storage 22.

TRANSFER_SET-UP_TIME is an estimate of the time to perform mechanical and other set-up operations that are required before data can be transferred from the secondary storage 22. In the case the secondary storage 22 is a tape library, this time would include the time needed for a robotic arm to load the tape cartridge in the tape drive and position the tape head to retrieve data. In the case the secondary storage 22 is a hard disk drive, this time could include the time to position the disk drive actuator for data retrieval. Other storage devices, such as optical disks and holographic units, may include other set-up times that must be performed in order to transfer data.

TOTAL_DELAY_TIME: the total estimated time to process all requests queued against the secondary storage 22.

The logic of FIG. 7 begins at block 200 where the proxy server program 16 processes a request to retrieve a file, such as at block 102 in FIG. 4. Control transfers to block 202 where the proxy server program 16 determines whether the requested file is in the cache 24. If so, control transfers to block 208 to determine whether the file in cache 24 has expired. The proxy server program 16 may use methods known in the art to determine whether the copy of the requested file in the cache 24 has expired, such as by examining an expiration time stamp or querying the server 4a, b, c originating the requested file to determine if the copy maintained by the proxy server 16 is the most recent version. If the file is not maintained in cache 24 (the no branch of block 202) or the file has expired (the yes branch of 208), then control transfers to block 206 where the proxy server program 16 retrieves the file from a server 4a, b, c over the network 10b. If the copy of the file in cache 24 has not expired, then control transfers to block 210.

At block 210, the proxy server program 16 determines whether the requested file is in primary storage 20. If so, control transfers to block 212 where the proxy server program 16 returns the requested file from primary storage 20. Otherwise, if the file is in secondary storage 22, the proxy server program 16 locks (at block 214) the Request Queue for the secondary storage 22. Control then transfers to block 216 where the TOTAL_DELAY_TIME is set to the value returned from the DETERMINE_RETRIEVAL_DELAY( ) routine called at block 214 and described with respect to FIG. 8. Control transfers to block 218 where the proxy server program 16 determines whether the TOTAL_DELAY_TIME is less than the maximum acceptable delay time, i.e., CONFIGURED_MAX_DELAY_TIME. If so, control transfers to block 220 to add the request to the Request Queue to retrieve the requested file from the secondary storage 22. Otherwise, control transfers to block 206 to retrieve and return the requested file from a server 4a, b, c over the network 10b. From block 220, control transfers to block 222 where the proxy server program 16 unlocks the Request Queue to allow requests to be queued against the secondary storage 22.

FIG. 8 illustrates logic for the DETERMINE_DATA_DELAY( ) routine called at block 216 to return the estimated time to process all requests currently queued against the secondary storage 22. Control begins at block 230 where the proxy server program 16 processes a call to the routine DETERMINE_DATA_DELAY. Control transfers to block 232 where the proxy server program locks the Request Queue to prevent other requests from being queued against the secondary storage 22. At block 234, the variable TOTAL_DELAY_TIME is set to zero. Then, at block 236, a loop begins for each of the r entries in the REQUEST_OBJECT_SIZE vector, which includes the file size of each request queued against the secondary storage 22. Control transfers to block 238 where the proxy server program 16 estimates the time needed to transfer data from the secondary storage 22 (DATA_TRANSFER_TIME) by dividing the size of the rth object in the REQUEST_OBJECT_SIZE vector by the data transfer rate of the secondary storage 22 (DATA_TRANSFER_RATE). Control transfers to block 240 where the proxy server program 16 estimates the total time for retrieving requested data (TOTAL_DELAY_TIME) by summing: (1) the time to perform set-up and positioning operations in the secondary storage 22 before data transfer (TRANSFER_SET-UP_TIME); (2) the time needed to transfer the requested data after set-up operations from the secondary storage 22 (DATA_TRANSFER_TIME); and (3) the current value of the TOTAL_DELAY_TIME. From block 240, control transfers to block 242 where the proxy server program goes to the start of the loop 236 to process the next value $\hat{R}+1$) in the REQUEST_OBJECT_SIZE vector to determine the estimated time to process the next queued request to add to the total delay time. After estimating the time to process all queued requests for data from the secondary storage, i.e., the loop is iterated for all objects in the REQUEST_OBJECT_SIZE queue, control transfers to block 244 to return the estimated TOTAL_DELAY_TIME value.

The logic of FIGS. 7 and 8 is described with respect to a secondary storage 22 that comprises a single storage device or tape drive unit. However, the logic of FIGS. 7 and 8 may be modified for a system in which the secondary storage 22 is comprised of multiple storage devices that may be accessed concurrently, such as the case if the secondary storage 22 is comprised of multiple tape drives. In the case where the storage device 22 includes multiple drives, such as tape drives, that may be concurrently accessed, the logic of FIG. 8 may be modified such that the DATA_TRANSFER_RATE is the combined rate of the multiple drives and the TRANSFER_SET-UP_TIME is divided by the number of drives as set-up operations can occur concurrently. Other modifications may be made to accommodate different systems.

The logic of FIGS. 7 and 8 is applicable to those situations where a file migrated to the secondary storage 22 file can otherwise be obtained from a server 4a, b, c over a network 10b such as the Internet or World Wide web. Current hierarchical storage management systems employ migration in situations where a copy of the file cannot otherwise be obtained. Thus, with current migration systems, the migrated file will have to be retrieved from secondary storage regardless of the delay time for servicing the request from secondary storage. With preferred embodiments, a copy of the file may be retrieved from over the network 10b, thereby providing an alternative to retrieving the file from secondary storage 22 if the delay time for secondary storage 22 exceeds a an acceptable maximum delay time.

ALTERNATIVE EMBODIMENTS/CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

In preferred embodiments, the logic of FIGS. 4, 5, 7, and 8 is implemented as software logic in the proxy server program 16 and HSMFS program 18. Logic steps described as implemented in the proxy server program 16 or HSMFS program 18 may be implemented elsewhere in the proxy server 6. In further embodiments, the logic of FIGS. 4, 5, 7, and 8 may be implemented as hardware or as a combination of hardware and software logic. The preferred logic of FIGS. 4, 5, 7, and 8 is for illustrative purposes, such that steps may be added, removed, and the sequence of steps changed.

The preferred embodiment migration technique of FIGS. 4 and 5 was described as implemented in a proxy server 6 that accesses requested files from over a network. However, in alternative embodiments, the preferred migration algorithm may be implemented in server environments other than a proxy server and may be used to determine migration thresholds in general.

The preferred embodiments of FIGS. 7 and 8 were described with respect to a secondary storage that provides additional storage space for caching files. In alternative embodiments, the secondary storage may be the only storage device that caches files retrieved from over the network 10b. In such case, the file would either be accessed from the secondary storage or retrieved from over the network if the delay time of retrieving the file from the secondary storage exceeded a maximum delay time.

Preferred embodiments were described with respect to a primary storage and secondary storage, wherein the primary storage comprises a memory device that is faster than the secondary storage. In alternative embodiments, the primary and secondary storage may be comprised of any non-volatile memory devices and the primary storage may not be faster than the secondary storage.

Advantages of the preferred embodiments were described in network systems where a greater number of requests are made for smaller files than larger files and where the requests toward the larger files would consume substantial network bandwidth if retrieved from over the network 10b. However, the preferred algorithms may apply regardless of the actual file request distribution. Notwithstanding, any changes in the file request distribution and data transfer capabilities of the secondary storage 22 will alter the determined minimum file size for migration and the decision of whether to retrieve the file from over the network (e.g., Internet) or from secondary storage 22. For instance, increasing the speed of the secondary storage device 22 will increase the likelihood a request is serviced from secondary storage as opposed to being retrieved from over the network 10b. Further, increasing the number of requests the secondary storage 22 can service per minute lowers the minimum file size for migration to allow smaller sized files to be migrated to and returned from the secondary storage 22.

Preferred embodiments were described with respect to the HTTP protocol for transmitting documents between computers within a network. However, those skilled in the art will appreciate that the preferred embodiments may apply to any communication protocol for allowing a client to request and access files in a network environment.

Requested files accessed over the network 10b and stored in the cache 24 may be in any type of file format, including the HTML format, Dynamic Hypertext Mark-Up Language (DHTML), the Extensible Markup Language (XML), any other Standard Generalized Markup Language (SGML), or any other language known in the art for creating interchangeable, structured documents, and files in a non-SGML file format, e.g., a text file format, image file (e.g., JPG, TIFF, GIF, etc.), movie file (e.g., MPEG), sound file, word processing file format, etc.

In preferred embodiments, there are separate network connections 10a and b between the client 8 and the proxy 6 and between the proxy server 6 and servers 4a, b, c, respectively. For instance, the client 8 may connect to the proxy server 6 via a LAN, cable connection, etc., and the proxy server 6 may connect to the servers 4a, b, c via another network. In alternative embodiments, there may be additional network connections among the client 8, proxy server 6, and servers 4a, b, c. Alternatively, the client 8, proxy server 6, and servers 4a, b, c may connect to the same network. In such case, any attempt of the client 8 to connect to the servers 4a, b, c will initially be routed to the proxy server 6.

In preferred embodiments, a proxy server caches files retrieved from over a network for later serving to client computers. In alternative embodiments, computer systems other than proxy servers may utilize the primary and secondary storage to cache files retrieved from a server over a network.

In summary, preferred embodiments disclose a system, method, and program for caching files retrieved from a server over a network. A computer system receives a request from a requesting computer system for a file maintained on the server. The computer system is capable of communicating with the server via the network. The computer system retrieves the requested file from the server over the network and stores a copy of the requested file in a primary storage. The computer system further returns another copy of the requested file to the requesting computer system. The computer system determines retrieved files to migrate from the primary storage to a secondary storage and migrates the determined retrieved files from the primary storage to the secondary storage. To determine the files to migrate from primary storage to secondary storage, the computer system may determine a distribution of file requests per unit of time according to file size for files maintained in the primary storage and the secondary storage. The computer system then processes the determined distribution and a provided maximum number of file requests per unit of time to determine a minimum file size for migration. Files having a size greater than the minimum file size for migration are migrated from the primary storage device to the secondary storage device.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for providing a cache to store files retrieved from a server over a network, comprising:

receiving with a computer system a request from a requesting computer system for a file maintained on the server, wherein the computer system communicates with the server via the network;

retrieving, with the computer system, the requested file from the server over the network;

storing a copy of the requested file in a primary storage and returning another copy of the requested file to the requesting computer system;

determining retrieved files to migrate from the primary storage to a secondary storage; and migrating the determined retrieved files from the primary storage to the secondary storage.

2. The method of claim 1, further comprising determining a minimum file size for migration, wherein determining retrieved files to migrate comprises determining retrieved files having a file size greater than the determined minimum file size for migration.

3. A method for migrating files from a primary storage device to a secondary storage device, comprising:

determining a distribution of file requests per unit of time according to file size for files maintained in the primary storage and the secondary storage;

providing a maximum number of file requests per unit of time;

processing the determined distribution and the maximum number of file requests per unit of time to determine a minimum file size for migration; and migrating files having a size greater than the minimum file size for migration from the primary storage device to the secondary storage device.

4. The method of claim 3, wherein the provided maximum number of file requests per unit of time is related to a number of file requests per unit of time that the secondary storage device can process.

5. The method of claim 3, wherein processing the determined distribution and maximum number of file requests per unit of time, comprises selecting the minimum file size for migration such that an aggregate number of file requests in the determined distribution for requested files having a size greater than the minimum file size for migration is less than or equal to the provided maximum number of file requests per unit of time.

6. The method of claim 5, wherein determining the distribution of file requests per unit of time according to file size comprises:

providing a data structure indicating file size ranges, wherein each file size range has an upper and lower file size bounds; and indicating in the data structure a number of file requests per unit of time for each file size range, wherein processing the determined distribution comprises processing the data structure.

7. The method of claim 5, further comprising retrieving files from one or more servers over a network and storing the retrieved files in the primary storage device, wherein the file requests are for files maintained in servers that are capable of being retrieved from over the network and wherein the migrated files are files retrieved from over the network.

8. The method of claim 6, wherein indicating in the data structure the number of file requests per unit of time comprises:

receiving requests for files;

determining, for each of the requested files, one of the file size ranges including the requested file; and incrementing, for each of the plurality of the requested files, the requests per unit of time for the determined file size range that includes the requested file.

9. The method of claim 6, wherein determining the minimum file size for migration comprises setting the minimum file size to a value, such that the aggregate of the number of file requests per unit of time for each file size range having an upper bound greater than the value is less than or equal to a number of file requests per unit of time that the secondary storage can process.

10. The method of claim 6, wherein determining the minimum file size for migration comprises:

setting a total requests value to zero; and initiating an iterative loop that starts with selecting the upper bound file size range and incrementally selecting a next lower file size range until the lower bound file size range is reached, comprising:

(i) setting the total requests value to a current total requests value plus the number of file requests per unit of time for the selected file size range;

(ii) determining whether the total requests value is less than or equal to a number of requests per unit of time that the secondary storage device can process;

(iii) setting the minimum file size for migration to the upper bound of the selected file size range and terminating the loop after determining that the total requests value is greater than the number of requests per unit of time that the secondary storage device can process; and (iv) selecting the file size range one file size range lower than the current selected file size range and proceeding to the start of the loop after determining that the total requests value is less than or equal to the number of requests per unit of time that the secondary storage device can process.

11. The method of claim 6, wherein the data structure includes requests per unit of time data for the file size ranges for different collection periods, and wherein indicating in the data structure the number of file requests per unit of time occurs during the collection periods.

12. The method of claim 11, wherein determining the minimum file size for migration further comprises determining an average file requests per unit of time for the file size ranges by averaging the file requests per unit of time for each file size range across multiple collection periods.

13. A system for caching files requested from a requesting computer system for files maintained on a server over a network, comprising:

a computer system in communication with the server via the network;

a primary storage system accessible to the computer system;

a secondary storage system accessible to the computer system, wherein the computer system manages the storage of data in the primary and secondary storage systems; and program logic implemented in the computer system, comprising:

(i) means for receiving a request from the requesting computer system for a file maintained on the server;

(ii) means for retrieving the requested file from the server over the network;

(iii) means for storing a copy of the requested file in the primary storage system and returning another copy of the requested file to the requesting computer system;

(iv) means for determining retrieved files to migrate from the primary storage system to the secondary storage system; and (v) means for migrating the determined retrieved files from the primary storage to the secondary storage.

14. The system of claim 13, further comprising determining a minimum file size for migration, wherein the means for determining retrieved files to migrate includes means for determining retrieved files having a file size greater than the determined minimum file size for migrating.

15. The system of claim 13, wherein the primary storage system has a faster data transfer rate than the secondary storage system.

16. The system of claim 13, wherein a cost per unit of storage for the primary storage system is greater than the cost per unit of storage for the secondary storage system.

17. The system of claim 13, wherein the primary storage comprises at least one hard disk drive and the secondary storage comprises at least one tape cartridge.

18. A system for migrating files from a primary storage device to a secondary storage device, comprising:

a computer system;

a memory included within the computer system to maintain information used during processing;

program logic executed by the computer system, including:
(i) means for determining a distribution of file requests per unit of time according to file size for files maintained in the primary storage and the secondary storage, wherein the determined distribution is maintained in the memory;
(ii) means for providing a maximum number of file requests per unit of time;
(iii) means for processing the determined distribution and the maximum number of file requests per unit of time to determine a minimum file size for migration; and
(iv) means for migrating files having a size greater than the minimum file size for migration from the primary storage device to the secondary storage device.

19. The system of claim 18, wherein the provided maximum number of file requests per unit of time is related to a number of file requests per unit of time that the secondary storage device can process.

20. The system of claim 18, wherein the program logic further comprises means for selecting the minimum file size for migration such that an aggregate number of file requests in the determined distribution for requested files having a size greater than the minimum file size for migration is less than or equal to the provided maximum number of file requests per unit of time.

21. The system of claim 20, wherein the means for determining the distribution of file requests per unit of time according to file size comprises:

means for providing a data structure stored in the memory indicating file size ranges, wherein each file size range has an upper and lower file size bounds; and means for indicating in the data structure a number of file requests per unit of time for each file size range, wherein the data structure is processed when determining the minimum file size for migration.

22. The system of claim 20, further comprising a network communication device for communicating with servers over a network, wherein the program logic further comprises:

means for receiving file requests from a requesting computer system for files maintained in the servers;

means performed by the network communication device for retrieving the requested file from the server over the network; and means for storing the retrieved files in the primary storage device, wherein the migrated files stored in the secondary storage device include files retrieved from over the network.

23. The system of claim 21, wherein the program logic further comprises:

means for receiving requests for files;

means for determining, for each of the requested files, one of the file size ranges including the requested file; and means for of indicating in the data structure the number of file requests per unit of time by incrementing, for each of the plurality of the requested files, the requests per unit of time for the determined file size range that includes the requested file.

24. The system of claim 21, wherein the program logic further comprises means for setting the minimum file size for migration to a value, such that the aggregate of the number of file requests per unit of time for each file size range having an upper bound greater than the value is less than or equal to a number of file requests per unit of time that the secondary storage can process.

25. A storage system for migrating files, comprising:

a primary storage device;

a secondary storage device:

a computer system maintaining data in the primary and secondary storage devices;

a memory within the computer system to maintain information used during processing; and program logic executed by the computer system, including:
(i) means for determining a distribution of file requests per unit of time according to file size for files maintained in the primary storage and the secondary storage, wherein the determined distribution is maintained in the memory;
(ii) means for providing a maximum number of file requests per unit of time;
(iii) means for processing the determined distribution and the maximum number of file requests per unit of time to determine a minimum file size for migration; and
(iv) means for migrating files having a size greater than the minimum file size for migration from the primary storage device to the secondary storage device.

26. The system of claim 25, wherein the program logic further comprises means for selecting the minimum file size for migration such that an aggregate number of file requests in the determined distribution for requested files having a size greater than the minimum file size for migration is less than or equal to the provided maximum number of file requests per unit of time.

27. The system of claim 25, further comprising a network communication device for communicating with servers over a network, wherein the program logic further comprises:

means for receiving file requests from a computer system for files maintained in the servers;

means performed by the network communication device for retrieving the requested file from the server over the network; and means for storing the retrieved files in the primary storage device, wherein the migrated files stored in the secondary storage device include files retrieved from over the network.

28. An article of manufacture for use in programming a computer system to cache files retrieved from a server over a network, the article of manufacture comprising a computer program in a computer useable medium accessible to the computer system, wherein the computer program is capable of causing the computer system to perform:

receiving a request from a requesting computer system for a file maintained on the server;

retrieving the requested file from the server over the network;

storing a copy of the requested file in a primary storage and returning another copy of the requested file to the requesting computer system;

determining retrieved files to migrate from the primary storage to a secondary storage; and migrating the determined retrieved files from the primary storage to the secondary storage.

29. The article of manufacture of claim 28, further comprising determining a minimum file size for migration, wherein determining retrieved files to migrate comprises determining retrieved files having a file size greater than the determined minimum file size for migration.

30. An article of manufacture for use in programming a computer system to migrate files from a primary storage device to a secondary storage device, the article of manufacture comprising a computer program in a computer useable medium accessible to the computer system, wherein the computer program is capable of causing the computer system to perform:

determining a distribution of file requests per unit of time according to file size for files maintained in the primary storage and the secondary storage;

providing a maximum number of file requests per unit of time;

processing the determined distribution and the maximum number of file requests per unit of time to determine a minimum file size for migration; and migrating files having a size greater than the minimum file size for migration from the primary storage device to the secondary storage device.

31. The article of manufacture of claim 30, wherein the provided maximum number of file requests per unit of time is related to a number of file requests per unit of time that the secondary storage device can process.

32. The article of manufacture of claim 30, wherein processing the determined distribution and maximum number of file requests per unit of time, comprises selecting the minimum file size for migration such that an aggregate number of file requests in the determined distribution for requested files having a size greater than the minimum file size for migration is less than or equal to the provided maximum number of file requests per unit of time.

33. The article of manufacture of claim 32, wherein determining the distribution of file requests per unit of time according to file size comprises:

providing a data structure indicating file size ranges, wherein each file size range has an upper and lower file size bounds; and indicating in the data structure a number of file requests per unit of time for each file size range, wherein processing the determined distribution comprises processing the data structure.

34. The article of manufacture of claim 32, further comprising retrieving files from one or more servers over a network and storing the retrieved files in the primary storage device, wherein the file requests are for files maintained in servers that are capable of being retrieved from over the network and wherein the migrated files are files retrieved from over the network.

35. The article of manufacture of claim 33, wherein indicating in the data structure the number of file requests per unit of time comprises:

receiving requests for files;

determining, for each of the requested files, one of the file size ranges including the requested file; and incrementing, for each of the plurality of the requested files, the requests per unit of time for the determined file size range that includes the requested file.

36. The article of manufacture of claim 33, wherein determining the minimum file size for migration comprises setting the minimum file migration size to a value, such that the aggregate of the number of file requests per unit of time for each file size range having an upper bound greater than the value is less than or equal to a number of file requests per unit of time that the secondary storage can process.

37. The article of manufacture of claim 33, wherein determining the minimum file size for migration comprises:

setting a total requests value to zero; and initiating an iterative loop that starts with selecting the upper bound file size range and incrementally selecting a next lowest file size range until the lower bound file size range is reached, comprising:

(i) setting a total requests value to a current total requests value plus the number of file requests per unit of time for the selected file size range;

(ii) determining whether the total requests value is less than or equal to a number of requests per unit of time that the secondary storage device can process;

(iii) setting the minimum file size for migration to the upper bound of the selected file size range and terminating the loop after determining that the total requests value is greater than the number of requests per unit of time that the secondary storage device can process; and (iv) selecting the file size range one file size range lower than the current selected file size range and proceeding to the start of the loop after determining that the total requests value is less than or equal to the number of requests per unit of time that the secondary storage device can process.

38. The article of manufacture of claim 33, wherein the data structure includes requests per unit of time data for the file size ranges for different collection periods, and wherein indicating in the data structure the number of file requests per unit of time occurs during the collection periods.

39. The article of manufacture of claim 38, wherein determining the minimum file size for migration further comprises determining an average file requests per unit of time for the file size ranges by averaging the file requests per unit of time for each file size range across multiple collection periods.

* * * * *